Patented Nov. 6, 1928.

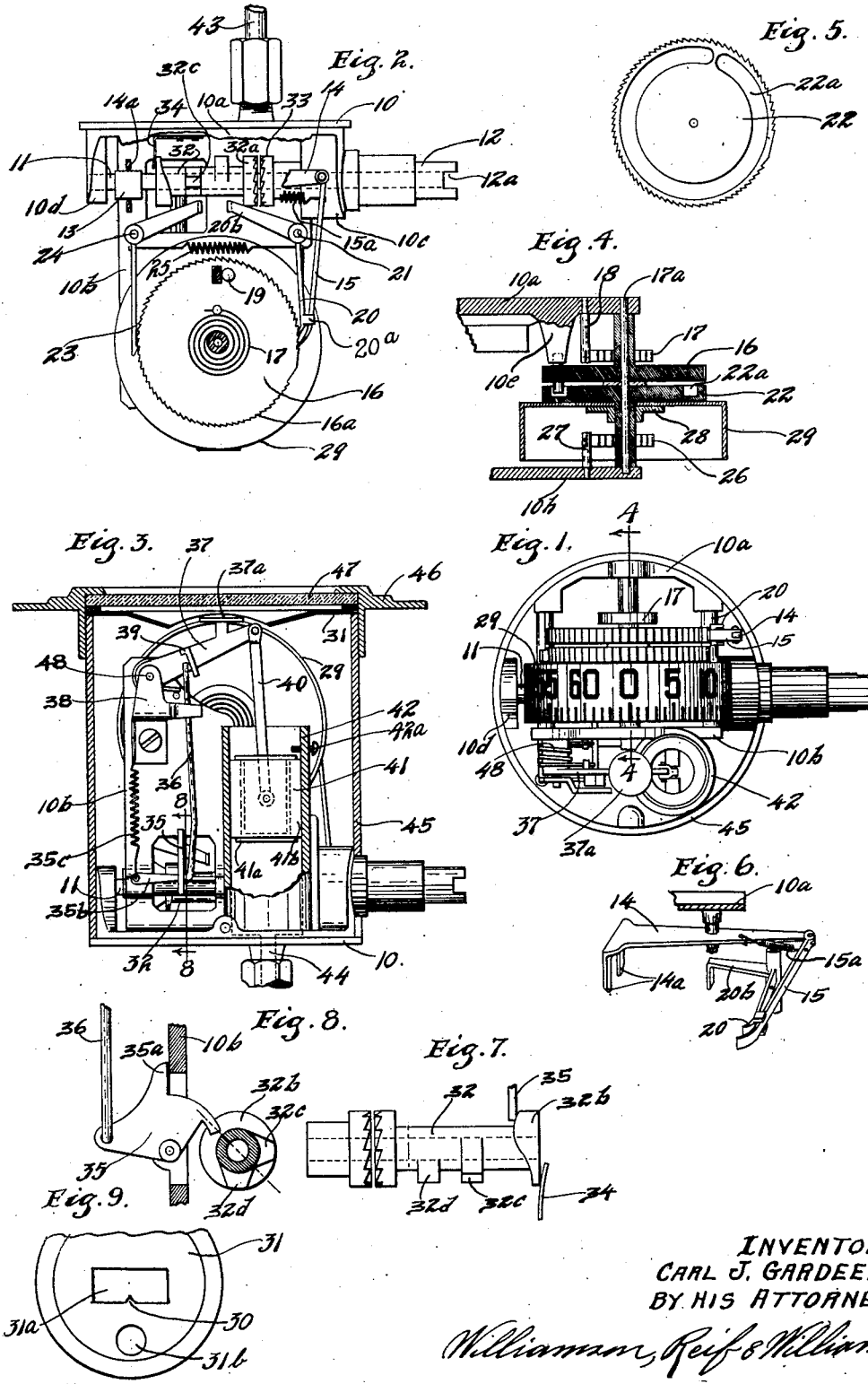

1,690,328

UNITED STATES PATENT OFFICE.

CARL J. GARDEEN, OF ST. PAUL, MINNESOTA.

FUEL-CONSUMPTION INDICATOR FOR AUTOMOBILES.

Application filed January 31, 1925. Serial No. 6,122.

This invention relates to an indicating instrument adapted to be used on a vehicle having propelling means which consumes fuel, and particularly to such an instrument which indicates the relation between the distance traveled and the amount of fuel consumed. While the invention may be applied to various vehicles, it is more particularly designed for use on the modern automobile and while the device may be marked in various ways to indicate the relation between the distance traveled and the amount of fuel consumed, the device is illustrated herein as indicating the number of miles the vehicle travels per unit of fuel, such as the number of miles per gallon of gasoline used.

It is an object of this invention, therefore, to provide a simple and efficient instrument of compact form which can conveniently be located on the instrument board and which will indicate the number of miles that the vehicle travels per unit of fuel used.

It is another object of the invention to provide such a device as set forth in the preceding paragraph, having means operated in a direct ratio to the distance the vehicle travels and other means cooperating therewith controlling an indicator which is operated and positioned at intervals, according to the amount of fuel consumed.

It is a further object of the invention to provide an instrument which will indicate the relation between the distance traveled and the amount of fuel consumed comprising means driven proportionately to the distance traveled by the vehicle, a member which is traversed from an initial position and returned to said position at intervals, another member controlling an indicator which is positioned at intervals by said first mentioned member, according to the traverse thereof prior to the return of said first mentioned member to its initial position, the intervals being determined by a member operated by a fuel measuring means on said vehicle.

It is a further object of the invention to provide a device such as set forth in the preceding paragraphs by simple and efficient mechanism compactly assembled and adapted to operate accurately.

These and other objects and advantages of the invention will more fully appear from the following description made in connection with the accompanying drawings in which like reference characters refer to the same parts throughout the different views, and in which—

Fig. 1 is a view in front elevation of the device having the cover plate removed;

Fig. 2 is a top plan view of the device with certain portions broken away; and others shown in horizontal section;

Fig. 3 is a bottom plan view of the device showing the front cover plate, said cover and the enclosing casing being shown in section, some of the parts being broken away and some parts shown in horizontal section;

Fig. 4 is a vertical section taken on the line 4—4 of Fig. 1, as indicated by the arrows;

Fig. 5 is a view in side elevation of the disk member used;

Fig. 6 is a fragmentary perspective view of a part of the mechanism;

Fig. 7 is a fragmentary view of a portion of the mechanism shown on an enlarged scale;

Fig. 8 is a partial view in vertical section taken on the line 8—8 of Fig. 3; and Fig. 9 is a front view of the cover plate.

Referring to the drawings, the device comprises a frame consisting of a back plate 10 from which extend spaced plates or partitions 10$^a$ and 10$^b$. The plate 10 has spaced bearings 10$^c$ and 10$^d$ thereon in which is journaled a shaft 11. Said shaft projects at the outer side of bearing 10$^c$ and has secured thereto one portion 12 of a clutch having a reduced portion at one end having therein a slot 12$^a$. The clutch 12 is of a common, well known form and adapted to receive thereon another clutch member having a tongue engaging in the slot 12$^a$ so that when said latter member is revolved the clutch 12 and shaft 11 will be revolved. The clutch 12 is adapted to be connected to a moving member of the vehicle, such as the wheel, so that it will be driven proportionately to the distance traveled by the vehicle or so that it will be driven in direct ratio to the distance traveled by the vehicle. In one practical embodiment of the invention, as at present used, the member 12 is connected by a flexible shaft to the driving shaft of the speedometer on the automobile. It is contemplated to have the instrument constructed in connection with the speedometer so that the speedometer driving shaft and the shaft 11 will be driven by the same means or mechanism. It is thought that it will be unnecessary for the purpose of this invention to illustrate the specific driving connection for the clutch 12 and shaft 11.

The shaft 11 has secured thereon adjacent the bearing 10ᵈ an eccentric 13. Said eccentric is disposed between the arms 14ᵃ of a fork lever 14, which lever is intermediately mounted beneath the plate or partition 10ᵃ, as shown in Fig. 6, portions of said lever being shown in Fig. 2. It will be seen that the arms 14ᵃ extend downwardly at substantially a right angle to the main body of lever 14, which body is shown of flat formation tapering toward the end opposite the arms 14ᵃ. At said latter end said lever is pivoted between the upper bifurcated end of a pawl 15, which pawl is pivoted on an axis parallel to the axis of lever 14 and extends forwardly substantially horizontally and is adapted to engage teeth 16ᵃ on a ratchet disk 16. The pawl 15 normally is urged into engagement with disk 16 by the tensile spring 15ᵃ secured thereto and secured at its other end to a lever 14. The ratchet disk 16 is journaled on a shaft 17ᵃ secured at its opposite ends in the plates 10ᵃ and 10ᵇ, as shown in Figs. 1, 2 and 4. The disk 16 has a sleeve projecting upwardly therefrom to which is secured one end of a torsion spiral spring 17, the other end of said spring being secured to a pin or rod 18 secured in plate 10ᵃ. The spring 17 is under some tension and normally tends to revolve the disk 16 so that a stop pin 19 thereon engages a stop lug 10ᵉ projecting downwardly from plate 10ᵃ. The teeth 16ᵃ on ratchet disk 16 are also engaged by a stop pawl 20 having spaced projecting lugs 20ᵃ between which the forward end of pawl member 15 is disposed and reciprocates. The pawl 20 is formed as a bell crank lever swinging about a pivot 21 secured in the disk 10ᵃ. The pawl 20 has an arm 20ᵇ adapted to be contacted by a cam member on shaft 11 to be later described. Mounted on the shaft 17 adjacent the disk 16 and separated therefrom by a thin washer is a ratchet disk 22 illustrated as of the same diameter as disk 16, the teeth of which are engaged by a stop or retaining pawl 23 also formed as a bell crank lever and mounted on a pivot member 24 secured in plate 10ᵃ, one arm of which pawl 23 extends inwardly at substantially the same angle as the arm 20ᵇ and is adapted to be engaged by a cam member mounted on shaft 11 which will also be later described. The stop pawls 20 and 23 are urged into engaging position with their respective ratchets by a spring 25 connected to said pawls at its opposite ends. The disk 22 has a downwardly projecting sleeve to which is secured one end of a spiral torsion spring 26, the other end of the said spring being secured to a pin 27 upstanding from the plate 10ᵇ and secured therein. The disk 22 also has secured in rigid relation thereto as by the collar 28, an indicating member 29 illustrated of cylindrical form, said indicating member thus rotating with the disk 22. While the indicating member may be inscribed in various ways, in the embodiment of the invention illustrated, it is shown as graduated and having thereon numerals which are arranged to represent the number of miles the vehicle travels per unit of fuel consumed. The said indicator co-operates with a pointer member 30 on the outer side of the cover plate 31, which cover plate has a central opening 31ᵃ therein through which the indicator is visible. The disk 22 is formed with a circular slot 22ᵃ therein in the side thereof adjacent the disk 16. The disk 16 also has a pin 19 projecting at one side thereof and disposed in the slot 22ᵃ. It will also be seen in Figs. 2 to 5 that the disk 16 has a portion of its periphery smooth or unprovided with teeth.

Disposed on the shaft 11 is a sleeve 32 having at one end a disk 32ᵃ provided with teeth and forming a half clutch. The disk 32ᵃ is adapted to co-operate with a similar half clutch disk 33 secured to the shaft 11 and rotating continuously therewith. The sleeve 32 is urged into position to engage the disks 32ᵃ and 33 by plate spring 34 secured to plate 10. The sleeve 32 is, however, held in position with disks 32ᵃ and 33 disengaged by a stop member 35 which acts upon a cam member 32ᵇ at one end of sleeve 32. The sleeve 32 also has cam projections 32ᶜ and 32ᵈ extending therefrom and spaced slightly circumferentially, which are adapted to contact and operate, respectively, the cam arms 20ᵇ and a similar arm on pawl lever 23. The stop member 35 is pivoted to the plate 10ᵇ and has a projection pivotally engaged by one end of a plunger rod 36, which plunger rod extends forwardly and terminates adjacent a lever 37 by which it is operated. The member 35 also has a projection 35ᵃ thereon adapted to engage plate 10ᵇ as a stop when the stop member 35 is in its inward position relative to cam 32ᵇ. The stop 35 also has an arm 35ᵇ extending from one side thereof connected to a tensile coiled spring 35ᶜ which has its other end secured to the member 38. Said lever 37 is pivoted at one end between the plate 10ᵇ and an offset lug or plate 38 secured thereto. The lever 37 has a lug 39 projecting from one side thereof having a short right-angled shoulder or portion thereon which, when the lever is moved rearwardly is adapted to contact the top of plunger rod 36. The lever 37 has pivoted, at its other end, one end of a connecting rod or link 40 pivotally connected at its other end to a piston 41 slidable and snugly fitting in a cylinder 42 extending forwardly from plate 10. While the piston 41 may be made in various ways, in the embodiment of the invention illustrated, it is shown as comprising a core 41ᵃ having projecting flanges or heads at its ends, which core, preferably, is made of suitable metal. A sleeve 41ᵇ surrounds the core and is disposed between said flanges or ends, which sleeve is preferably made of material having a low factor of expansion and contraction, such as graphite. Preferably, a screw 42ª is disposed in the wall of the cylinder 42 acting as a stop limiting the upward movement of piston 41. The bottom of cylinder 42 is connected by suitable conduit 43 and passage 44 to a fuel measuring device. In practice, on an automobile, the conduit 43 is connected to the vacuum chamber of the standard and well known gasoline vacuum feed device, such as the Stewart vacuum feed. It will be understood that said conduit could be connected to any fuel feeding device having a vacuum formed therein at intervals through which the fuel passes in regulated or measured amounts. The Stewart vacuum feed mechanism is so well known that it is thought it will be unnecessary to illustrate the same. In such a mechanism, gasoline is drawn into a receptacle by the suction produced by the pistons of the internal combustion engine commonly used in automobiles. When a certain amount of gasoline has been drawn into the receptacle the float is operated to cut off the suction and an air valve is opened which releases the gasoline to flow out of said receptacle. The suction is thus intermittently applied to the said receptacle and measured amounts of gasoline are drawn thereinto at intervals. Preferably, the conduit 43 is, as stated, connected to the vacuum chamber of this gasoline feed mechanism. The lever 37 also has a disk 37ª secured to its front side, which disk is adapted, when in its forward position, to be disposed in front of an opening 31ª in the front cover plate 31. The lever 37 is urged to its forward position or to its position with the piston toward the open end of the cylinder by means of the coiled tension spring 48 surrounding the hub portion of lever 37 concentric with its pivot and having one end engaging a pin on lever 37 and its other end engaging a pin projecting from plate 10ᵇ. The frame or casing of the device comprising the base 10 preferably is surrounded by a cylindrical casing 45 which is, in turn, embraced by the front plate or member 46 adapted to be secured to the top surface of an instrument board. The transparent plate or lens 47 is adapted to be held in place in front of the plate 31 by the member 46.

In operation, the clutch 12 will, as stated, be connected to a speedometer shaft or to some mechanism of the vehicle, such as a wheel so that it will be driven in direct ratio to the traverse of the vehicle and the conduit 43 will be connected to the vacuum chamber in the gasoline vacuum feed mechanism. The disk 16 will be turned so that the pin 19 is against stop 10ᵉ and disk 22 will be turned by its spring 26 so that one end of the slot 22ª contacts pin 19 and the indicator 29 will be positioned with the zero thereon alined with the pointer 30. As the vehicle travels, shaft 11 will be driven and lever 14 oscillated. This will reciprocate pawl 15 and disk 16 will be rotated against the tension of spring 17 by said pawl, said disk being prevented from return movement by the holding pawl 20. As disk 16 is thus rotated or traversed, disk 22 will be moved against the tension of spring 26 and will be prevented from return movement by the pawl 23. The stop 35 will hold the sleeve 32 with the clutch disk 32ª disengaged so that the sleeve will not be driven. During this described movement of the parts, the gasoline in the vacuum feed mechanism is being used and when a new charge of gasoline is to be drawn thereinto by the suction from the engine, the suction or low pressure will extend into the rear or closed end of the cylinder 42. This will cause the piston 41 to be moved toward the closed end of the cylinder by the pressure of air on its outer side. This piston 41 thus moves lever 37 which will be drawn rearwardly about its pivot and the shoulder on the member 39 will contact the free end of plunger 36 so that said plunger will be pushed rearwardly and, as will be seen from Fig. 8, stop 35 will be drawn out of alinement with cam 32ᵇ. Spring 34 then moves sleeve 32 lengthwise of shaft 11 and clutch disks 32ª and 33 are engaged and sleeve 32 begins to revolve. As lever 37 continues its rearward movement and passes the point where its center line is at right angles to the center of cylinder 42, the rear end of projection 39 will begin to swing inwardly and will push the free end of plunger 36 out of engagement with the shoulder thereon. Plunger 36 is thus freed and spring 35ᶜ moves plunger 36 forwardly and at the same time swings stop 35 inwardly toward sleeve 32. The inner end of stop 35 will strike the outer side of cam 32ᵇ but will move across the face of said cam as soon as the narrow part of the cam revolves into alinement with stop 35. The sleeve 32 continues to revolve and cam 32ᶜ strikes one arm of pawl 23 and forces said pawl out of engagement with ratchet disk 22. This disk is then free to be rotated reversely or returned toward its initial position by spring 26. However, as the end of slot 22ª is already in engagement with pin 19, it cannot, in the operation so far described, move backward. Cam projection 32ᶜ soon passes the arm of pawl 23 and said pawl again engages ratchet disk 22 so that said disk and indicator 29 are held in the position to which they have been moved by ratchet disk 16. As soon as ratchet disk 22 is thus re-engaged by pawl 23, cam projection 32ᵈ will engage arm 20ᵇ of pawl 20. This will disengage pawl 20 from disk 16 and will also disengage pawl 15 therefrom as the latter will be pushed out with pawl 20. Disk 16 is now free and is quickly turned back to its initial position with pin 19 against stop 10ᵉ, by spring 17. Shaft 11, however, is continuously revolving and the pawls 20 and 15 are again quickly brought into engagement with disk 16 and it is again moved by pawl 15. When sleeve 32 has made one revolution the wide part of cam 32ᵇ co-operates with the stop 35 and the sleeve is moved to withdraw clutch disk 32ᵃ from engagement with clutch disk 33. Disk 16 will then continue to be revolved until suction is again applied to the vacuum feed mechanism when piston 41 will be again operated and stop 35 again withdrawn and the sleeve 32 again driven by shaft 11. The sleeve 32 will then, by its cam 32ᶜ, again release pawl 23 so that disk 22 is again freed to be turned backward by its spring 26. If disk 16 has been moved a smaller distance than previously, disk 22 will return until the end of groove 22ᵃ engages pin 19. If disk 16 has been moved a greater distance than before, it will move disk 22 and the indicator 29 still farther, said indicator moving to the left, as seen in Fig. 1. The disk 22 and indicator 29 will, if disk 16 has moved a greater or lesser distance than formerly, be held in their new position by pawl 23. Pawls 15 and 20 will now again be disengaged by cam 32ᵈ and disk 16 will again be returned to its initial position by its spring 17. It will thus be seen that each time that the measured supply of gasoline or fuel passes through the vacuum feed mechanism the disks 16 and 22 will be released and the disk 22 and indicator 29 will be positioned in accordance with the distance moved by the disk 16. The reading on the indicator or the numerals on the indicator alining with pointer 30 will thus show the miles made by the vehicle per unit of fuel. In practice, the indicator is calibrated so that the numerals indicate miles made per gallon of fuel. The operation of piston 41 occurs quite frequently in the ordinary automobile, said piston being operated once in about every half mile. The reading on the indicator, therefore, at the successive positions thereof will show the consumption of fuel taking place at the rate of miles made per gallon of fuel. The flat places or the places without teeth are provided on the disk 16 so that in case the disk would be excessively moved as when the automobile might be coasting, down a long hill at high speed, the mechanism will not be injured on account of the disk not being released. When the pawls reach the flat portion of the disk the disk will cease to be driven. This also prevents any breakage in case the piston 41 should become stuck, which might conceivably happen. It will be noted that the piston is controlled with lever 37 by the torsion spring 48 but it should also be noted that plunger 36 and stop 35 are repositioned by spring 35ᶜ so that sleeve 32 can make only one revolution and the cams 32ᵈ and 32ᶜ will thus only operate once with every operation of piston 41. The disk 37ᵃ will intermittently be positioned in front of opening 31ᵃ and will move into plain sight every time that piston 41 is reciprocated. If it is desired to make a record of the readings of the indicator this can be done every time said disk appears close to said opening 31ᵃ.

From the above description it is seen that applicant has provided a very simple and efficient mechanism for indicating the relation between the distance traveled and the amount of fuel consumed. The instrument indicates at short intervals the miles per gallon being made and the reading is changed or corrected at every new charge of fuel taken through the fuel measuring device, such as the vacuum gasoline feed mechanism. The device will be mounted on the usual instrument board of the vehicle and the same can conveniently be combined with the usual speedometer which is customarily on the instrument board. The device has been in use for quite a long period on a standard automobile using the standard Stewart vacuum feed for the fuel and the device has proven very successful and efficient. The vacuum feed mechanism which comprises a float which is adapted to operate valves when in its different positions, has been found to be quite accurate for measuring the fuel used and in its operation of the device of the present invention. The device is small, compact and the mechanism thereof is quite simple.

It will, of course, be understood that various changes may be made in the form, details, arrangement and proportions of the parts without departing from the scope of applicant's invention which, generally stated, consists in the novel parts and combinations of parts disclosed and defined in the appended claims.

What is claimed is:

1. An indicating device for showing the relation between the distance traveled by a vehicle and the fuel used for driving said vehicle having in combination, means including pawl and ratchet mechanism moved an amount proportional to the distance the vehicle travels, resilient means for retracting said means, indicating means co-operating therewith, and means including a clutch and cam-operated tripping means operated by a fuel measuring device for controlling the operation of said first mentioned means.

2. An indicating device for showing the relation between the distance traveled by a vehicle and the fuel used for driving said vehicle having in combination, a revoluble means operated in direct ratio to the travel of said vehicle, a member moved by said means, a second member adapted to be positioned at intervals according to the distance moved by said first mentioned member, an indicator controlled by said second member, and means adapted to be operated by a fuel measuring device on the vehicle and including a rotatable tripping means and a cam and spring-operated clutch for controlling said second member and determining said intervals.

3. An indicating device for showing the relation between the distance traveled by a vehicle and the fuel used for driving said vehicle having in combination, means driven proportionately to the travel of the vehicle, a member moved at intervals from an initial position and being releasable to return to initial position, means urging said member to initial position when released, a member movable by and adapted to be positioned at intervals by said first mentioned member and being releasable to move forward an initial position, an indicating means controlled by said last mentioned member, means urging said last mentioned member toward its initial position when released, and means controlled by a fuel measuring device on the vehicle including a cam-operated tripping means and a clutch controlled operating means therefor to release said last mentioned member to permit it to position said indicating means and then to release said first mentioned member.

4. An indicating device for showing the relation between the distance traveled by a vehicle and the fuel used for driving said vehicle having in combination, a ratchet member moved in direct proportion to the distance the vehicle travels, a second ratchet member adapted to be positioned by said first mentioned ratchet member, an indicator controlled by said last mentioned ratchet member, means for holding said ratchet members in the position to which they have been moved, means operating at intervals for releasing said holding means, and means controlled by a fuel measuring device on the vehicle including a cam-operated member and a clutch for controlling the same for operating said last mentioned means.

5. An indicating device for showing the relation between the distance traveled by a vehicle and the fuel used for driving said vehicle having in combination, a shaft driven proportionately to the travel of said vehicle, a piston moved intermittently in relation to the fuel supplied, a sleeve on said shaft, a tripping means on said sleeve, a rotatable member operated for intermittent movement from said shaft, means for retracting said member when tripped by said tripping means, a clutch for connecting said sleeve to said shaft, a stop operated by said piston for permitting said clutch to become engaged, and an indicating means connected to said rotatable member.

6. An indicating device for showing the relation between the distance traveled by a vehicle and the fuel used for driving said vehicle having in combination, means driven in direct proportion to the distance said vehicle travels, a member intermittently rotated by said means, means for retracting said member when tripped, a tripping means for said member, an indicating means positioned by said member, an actuating means for said tripping means, means including an intermittently engaged clutch for operating said actuating means, and a member intermittently moved in relation to the fuel used for permitting engagement of said clutch.

7. A device for showing the relation between the distance traveled by a vehicle consuming fuel for motive power and the amount of fuel used, having in combination, a rotatable means operated in a direct proportion to the distance the vehicle travels, an indicating means co-operating therewith, a reciprocating member controlled by a fuel measuring device for controlling said indicating means, a connecting means for connecting said indicating means and first mentioned means including a spring controlled pawl and ratchet mechanism, a tripping means co-operating with said connecting means and a clutch actuated from said first mentioned means for controlling said tripping means.

In testimony whereof I affix my signature.

CARL J. GARDEEN.